US011094099B1

(12) United States Patent
Jonkajtys et al.

(10) Patent No.: US 11,094,099 B1
(45) Date of Patent: Aug. 17, 2021

(54) ENHANCED HYBRID ANIMATION

(71) Applicants: Grzegorz Jonkajtys, Atlanta, GA (US); L. Chad Crowley, Atlanta, GA (US)

(72) Inventors: Grzegorz Jonkajtys, Atlanta, GA (US); L. Chad Crowley, Atlanta, GA (US)

(73) Assignee: Trioscope Studios, LLC, Atlanta, GA (US)

(*) Notice: Subject to any disclaimer, the term of this patent is extended or adjusted under 35 U.S.C. 154(b) by 115 days.

(21) Appl. No.: 16/678,238

(22) Filed: Nov. 8, 2019

Related U.S. Application Data

(60) Provisional application No. 62/757,470, filed on Nov. 8, 2018.

(51) Int. Cl.

| | |
|---|---|
| ***G06T 13/40*** | (2011.01) |
| ***H04N 5/265*** | (2006.01) |
| ***H04N 5/272*** | (2006.01) |

(52) U.S. Cl.
CPC ............ *G06T 13/40* (2013.01); *H04N 5/265* (2013.01); *H04N 5/272* (2013.01); *H04N 2005/2726* (2013.01)

(58) Field of Classification Search
None
See application file for complete search history.

(56) References Cited

U.S. PATENT DOCUMENTS

| | | | | |
|---|---|---|---|---|
| 4,695,141 | A | 9/1987 | Servals | |
| 6,476,804 | B1 | 11/2002 | Costabel | |
| 7,486,296 | B2 | 2/2009 | Yao | |
| 7,654,678 | B1 | 2/2010 | Runco | |
| 7,907,793 | B1 | 3/2011 | Sandrew | |
| 8,237,730 | B1 | 8/2012 | Anderson | |
| 9,576,388 | B2 | 2/2017 | Brunner | |
| 9,754,629 | B2 | 9/2017 | Mertens | |
| 2006/0082579 | A1* | 4/2006 | Yao | G06T 11/00 345/473 |
| 2008/0012866 | A1 | 1/2008 | Forbes | |
| 2010/0092107 | A1* | 4/2010 | Mochizuki | H04N 9/8211 382/309 |
| 2010/0231692 | A1 | 9/2010 | Perlman | |
| 2011/0176058 | A1 | 7/2011 | Biswas | |
| 2012/0002014 | A1 | 1/2012 | Walsh | |

(Continued)

OTHER PUBLICATIONS

Nedzved et al.,"Line Object Recognition in Low Contrast Color Images", 8th International Conf. on Pattern Recognition and Information Processing (PRIP'2005), May 18-20, 2005, Minsk, Belarus. pp. 291-294 ). (Year: 2005).*

*Primary Examiner* — Saptarshi Mazumder
(74) *Attorney, Agent, or Firm* — Culhane Meadows PLLC

(57) ABSTRACT

Systems and methods are described for applying a unifying visual effect, such as posterization, to all or most of the visual elements in a film. In one implementation, a posterization standard includes a line work standard, a color palette, a plurality of color blocks characterized by one or more hard edges, and a gradient transition associated with each of the hard edges. The visual elements, including live actors and set pieces, are prepared in accordance with the posterization standard. The actors are filmed performing live among the set pieces. The live-action segments can be composited with digital elements. The result is a combination of both real and stylized elements, captured simultaneously, to produce an enhanced hybrid of live action and animation.

4 Claims, 10 Drawing Sheets

(56) References Cited

U.S. PATENT DOCUMENTS

| | | | | |
|---|---|---|---|---|
| 2014/0376888 | A1 | 2/2014 | Mochizuki | |
| 2014/0132789 | A1* | 5/2014 | Koyama | G06T 7/194<br>348/218.1 |
| 2015/0378999 | A1* | 12/2015 | Dorner | G06F 16/235<br>707/745 |
| 2016/0014347 | A1* | 1/2016 | Van Eynde | G11B 27/10<br>386/280 |
| 2017/0213576 | A1* | 7/2017 | Nugumanov | G06K 9/00664 |
| 2019/0346745 | A1* | 11/2019 | Tindall | G03B 15/06 |

* cited by examiner

ENHANCED HYBRID ANIMATION

CROSS REFERENCE TO RELATED APPLICATIONS

The present application claims the benefit of and priority to U.S. Provisional Application 62/757,470, filed Nov. 8, 2018, and entitled "Systems and Methods of Producing Enhanced Hybrid Animation," which is incorporated herein by reference in its entirety.

TECHNICAL FIELD

Certain disclosed implementations relate to the field of motion pictures and film production. More particularly, but not by way of limitation, the present disclosure describes systems and methods of applying a visual effect, such as posterization, across all or most of the visual elements in a segment of film.

BACKGROUND

The art and science of integrating live-action footage with computer-generated (CG) visual elements has improved significantly in recent years. Using visual effects technology, live-action footage can be integrated with digital visual elements to create environments that look realistic but would be impossible, impractical, or dangerous to create and capture on film. Live actors can appear to be immersed in an imaginary environment where they interact with CG characters and other digital visual elements.

BRIEF DESCRIPTION OF THE DRAWING

Features of the various implementations disclosed will become more apparent in the following detailed description, in which reference is made to the appended drawing figures. Corresponding reference numbers indicate corresponding parts or elements throughout the several views of the drawing. The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures, wherein.

DETAILED DESCRIPTION

Figure 1:
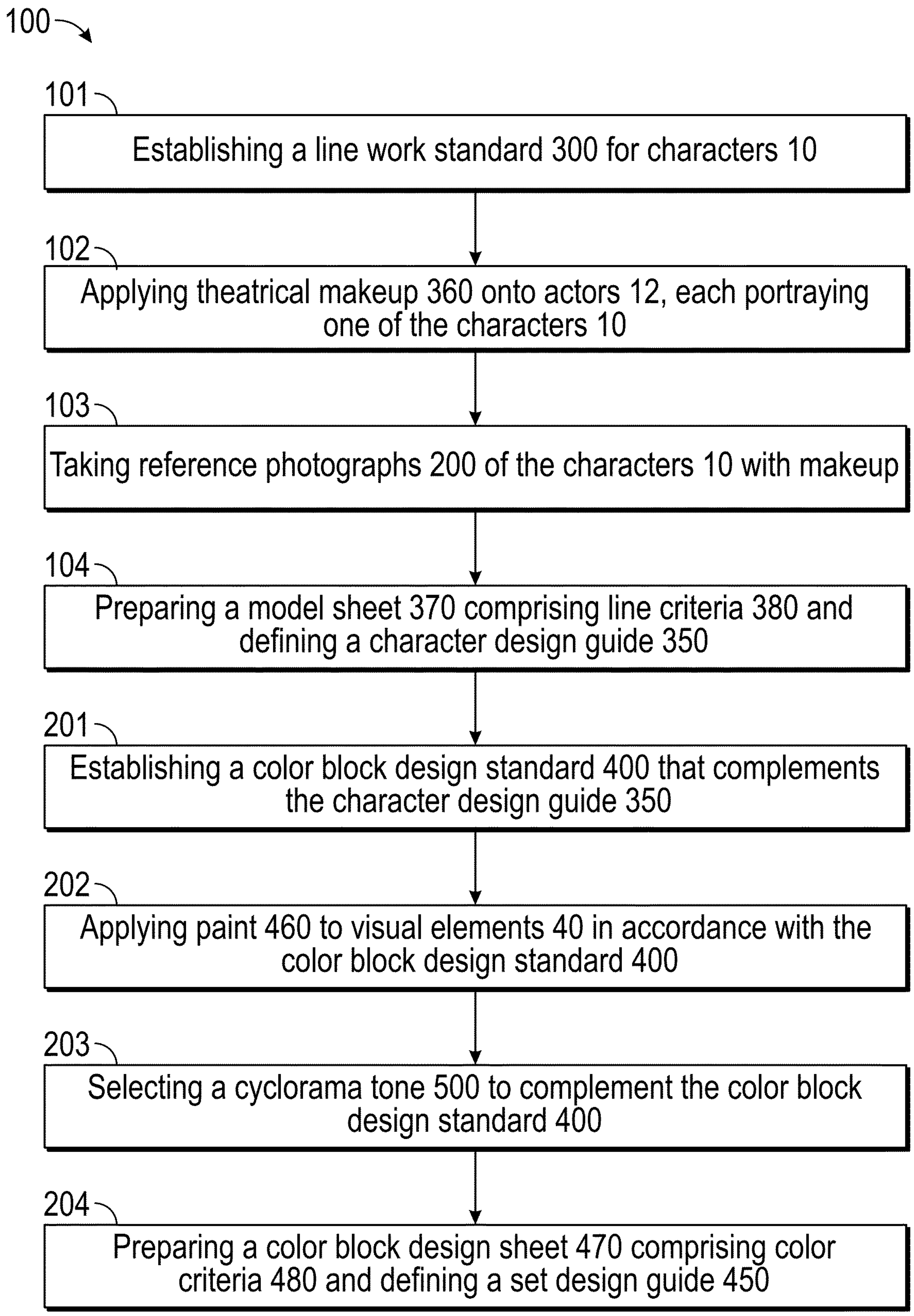
FIG. 1 is a flow chart listing some of the steps in an example method.

Various implementations and details are described with reference to an example method of producing hybrid animation. In the example implementation, the method includes a first step of establishing a posterization standard. The standard includes a line work standard, a color palette, a plurality of color blocks characterized by one or more hard edges, and a gradient transition associated with each of the hard edges. The next step is preparing one or more visual elements in accordance with the posterization standard. The visual elements include actors and set pieces. The next step is filming the actors performing live among the set pieces to capture a first segment of live-action film. Another step may include compositing the live-action film with one or more digital elements. In this example implementation, both the actors and the set pieces have been prepared to look posterized. The result is a hybrid of live actors and set pieces in which all the visual elements have been prepared according to a single, unifying posterization standard.

The present systems and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known implementation. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "facilitate" means to aid, assist, or make easier. The term "impede" means to interfere with, hinder, or delay the progress.

As used herein, the terms "proximal" and "distal" are used to describe items or portions of items that are situated closer to and away from, respectively, a user or operator. Thus, for example, the side of an item nearest a person may be referred to as the proximal side, whereas the generally opposing side or far side may be referred to as the distal side.

The methods herein are described using filmmaking jargon. For example, the term "visual elements" includes characters, set pieces, computer-generated elements, and the like. Characters includes live actors, puppets, computer-generated characters and creatures, and the like. The term "set pieces" includes both portable objects referred to as theatrical property ("props") and larger pieces such as furniture, vehicles, buildings, and structures. The term "additional elements" includes things such as fire, smoke, explosions, bullet strikes, weather effects (rain, snow, fog), and natural phenomena. Theatrical makeup is applied to characters, including live actors. Paint or theatrical paint is applied to non-character elements. A cyclorama or "cyc" background refers to a single-color background, often called a blue screen or a green screen, which is used to allow chroma key compositing (or chroma keying) during post production. After live action is filmed in front of a cyclorama background, the background can be replaced with a digital background or with other elements (including, for example, additional or different live-action footage).

Although various implementations and implementations are described herein with reference to a motion picture produced in the style of posterized animation (to depict a graphic novel, for example), the systems and methods described herein may be used with any of a variety of styles, film types, production techniques, and storytelling methods.

Producing a film in a specific style (especially in a style that is unlike real life) presents unique and formidable challenges to filmmakers and visual effects artists. A film made in the style of a graphic novel, for example, has a visual appearance or look that is different from real life as we perceive it. Using existing technology, live actors would appear to be out of place in an environment that has the look and feel of animation. Accordingly, many films based on graphic novels are made with only animated elements or, instead, are adapted to include only live action. Both options are expensive, technically challenging, and often do not fully reflect the style of the graphic novel. Producing an all-animated feature film requires the artists to draw the characters in a graphic style, with an eye toward making the drawn characters appear to express all the variety of expressions and emotions necessary for good storytelling. Producing a live-action film requires the artists to create digital environments that look real (like the live actors) which may not successfully create an animation-like environment that looks like the graphic novel.

Enhanced hybrid animation, as described herein, includes systems and methods of producing a film in which both live actors and the set pieces have been prepared or stylized according to one, unifying visual effects standard.

The visual effects standard, according to one example implementation, is a posterization standard. Posterization refers to the use of a limited color palette which, in general, results in an image having a limited number of blocks of color bounded by one or more generally hard edges (where the color changes from a first color to a second color). Each hard edge includes a gradient transition between the adjacent colors. The gradient transition along the hard edge may be a line (most abrupt) or it may include a pattern (less abrupt than a line, but still visible).

A posterization standard, in one implementation, includes a line work standard, a color palette, a plurality of color blocks characterized by one or more hard edges, and a gradient transition associated with each of the hard edges. The standard applies across most or all the visual elements in a film, including live actors who wear makeup that includes line work, colors from the palette, and color blocks with hard edges. Digital tools may be used to isolate and enhance any elements of the posterization standard. In practice, the character design and the set design cooperate to facilitate the consistent posterization of substantially all the visual elements.

Reference is now made in detail to the example implementations illustrated in the accompanying drawings and discussed below.

FIG. 1 is a flow chart of an example method of producing a piece of enhanced hybrid animation. According to an example implementation, the method 100 includes establishing a character design guide 350 (steps 101 through 104) and a set design guide 450 (steps 201 through 204). These steps are generally part of the step of establishing a posterization standard, which is developed during the pre-production or planning phase of film production.

Figure 5:
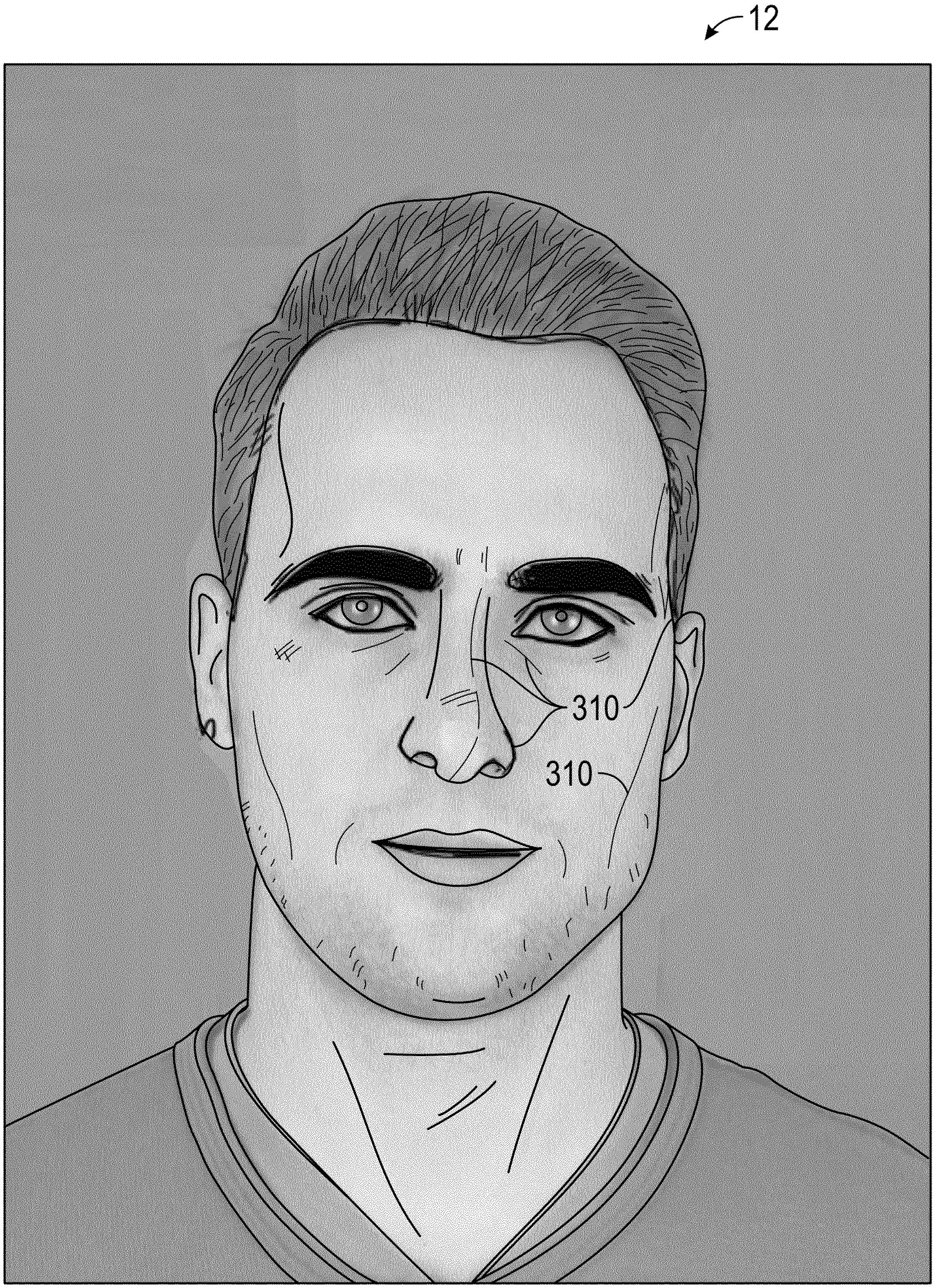
FIG. 5 is an illustration showing an example of line work applied to a character in accordance with a character design guide.
Figure 6:
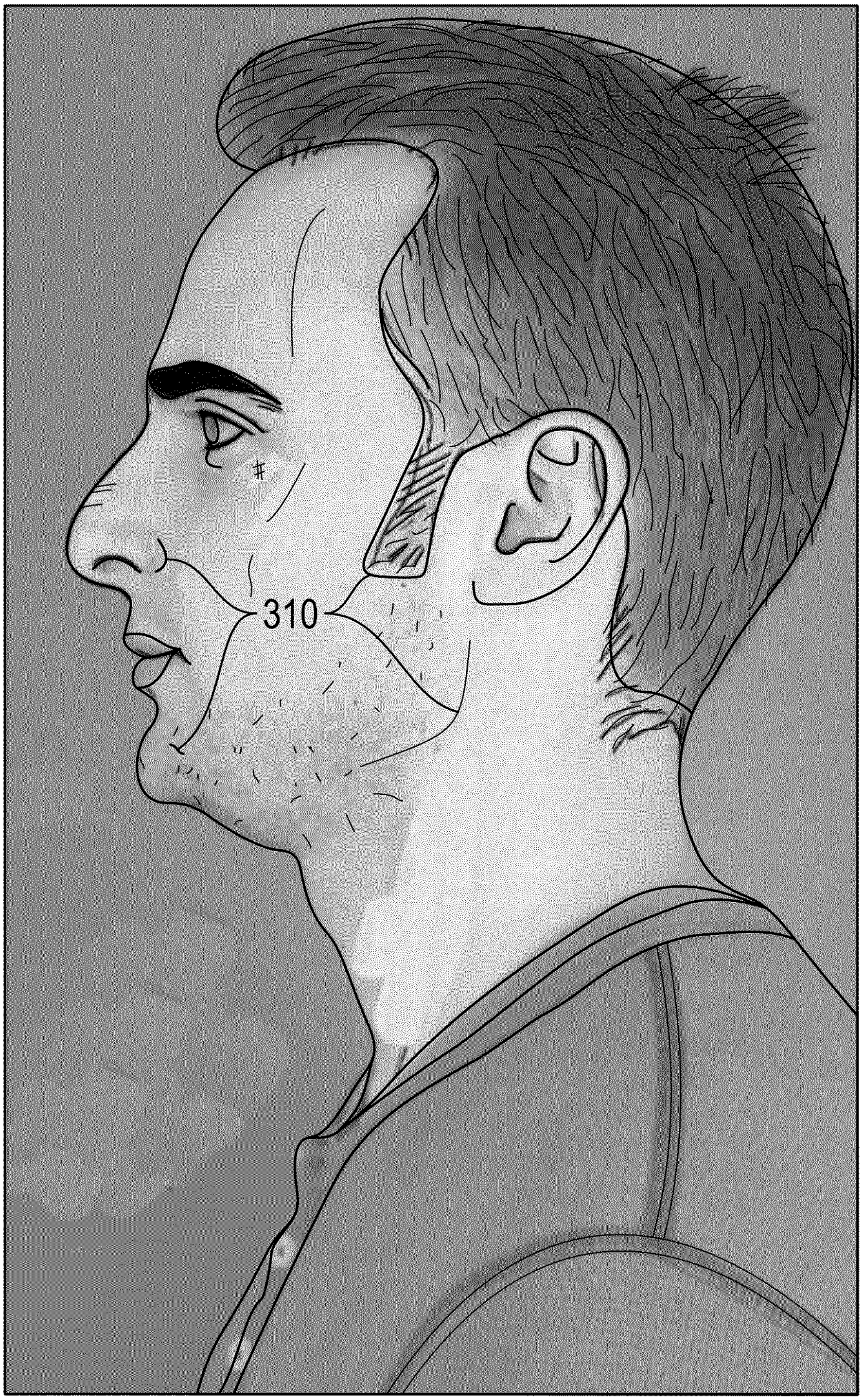
FIG. 6 is an illustration showing a further example of line work applied to a character in accordance with a character design guide.
Figure 8:
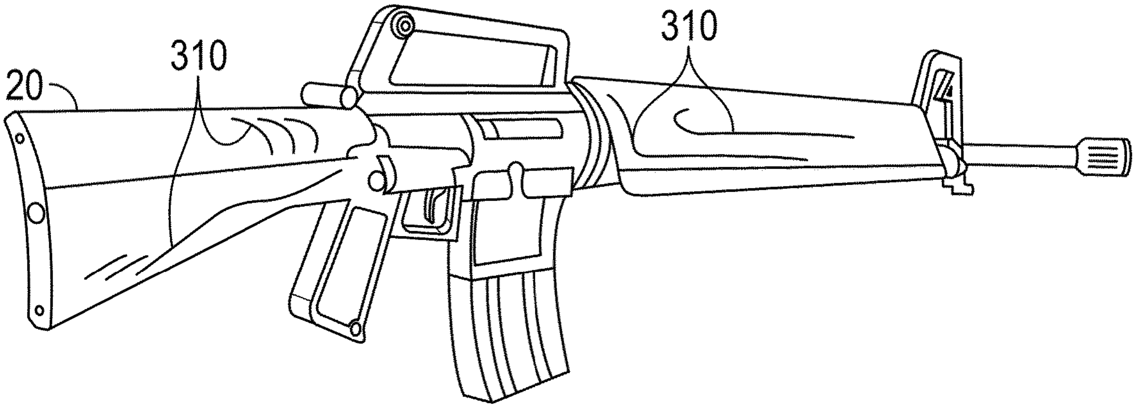
FIG. 8 is an illustration of a visual element marked with line work, in accordance with a posterization standard.

Establishing a character design guide 350, as shown, includes establishing a line work standard 300 (step 101) for each of the one or more characters 10 in accordance with the posterization standard for the project. The vision for a project may include the specific look or style to be applied using visual effects, such as posterized animation for depicting a graphic novel. Line work 310 includes any of the markings to be applied to the characters 10, including live actors 12. For example, as shown in FIG. 5 and FIG. 6, the line work 310 may include lines, sets of lines, hatching patterns, shading, stippling, outlines, contour lines, and any other stylized markings that might be applied to the face or body of a character 10 (and also to clothing and set pieces 20, as shown in FIG. 8). The line work 310, at this stage, may be applied to photographs of the characters 10 or actors 12, as shown in FIG. 5 and FIG. 6. The line work 310, of course, may evolve and change during pre-production, including the marking of photographs of multiple characters. The filmmaker or artist, by applying line work 310 in accordance with the vision establishes the first line work standard 300. In practice, all the line work 310 for the project would be applied according to the first line work standard 300.

Figure 7:
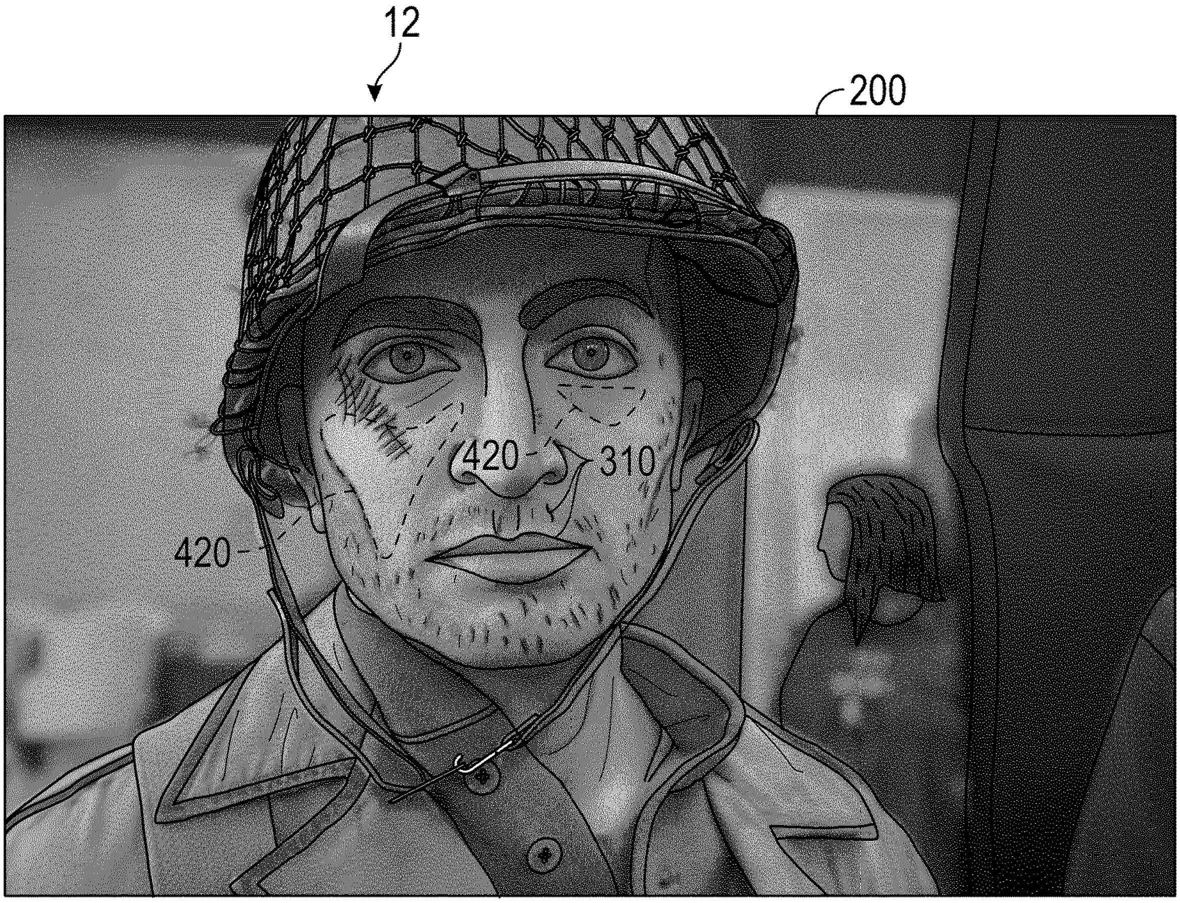
FIG. 7 is an illustration of a reference photograph of an actor prepared with makeup that includes color blocks and line work, in accordance with a posterization standard.

Step 102 includes applying makeup from a first theatrical makeup kit 360 to one or more of the characters 10, which may include CG characters and live actors 12, in accordance with the first line work standard 300. The kit 306 may include any of a variety of makeup colors, tools, and applicators that are useful in accomplishing all the parts of the first line work standard 300. FIG. 7 is an example of a photograph showing makeup applied to an actor 12 in accordance with a first line work standard 300. FIG. 7 also represents Step 103: taking a first set of reference photographs 200 of the characters 10 to show how the line work 310 is applied using the makeup kit 306 in accordance with a first line work standard 300.

Step 104 includes preparing a model sheet 370 which provides a detailed creative guideline for subsequent artists and technicians to follow, including a series of line criteria 380. The line criteria 380 may include the first line work standard 300, details about the first makeup kit 360, and the first set of reference photographs 200. In this aspect, the criteria 380 or model sheet 370 defines a character design guide 350 for the project.

Establishing a set design guide 450, in some implementations, includes establishing a first color block design standard 400 (step 201) in accordance with the vision for the project. The standard 400 is designed to complement the character design guide 350 as established in the previous steps. Coordinating the set design guide 450 with the character design guide 350 is part of applying the posterization standard, which results in applying a coherent look and feel to all the visual elements in the project.

Figure 9:
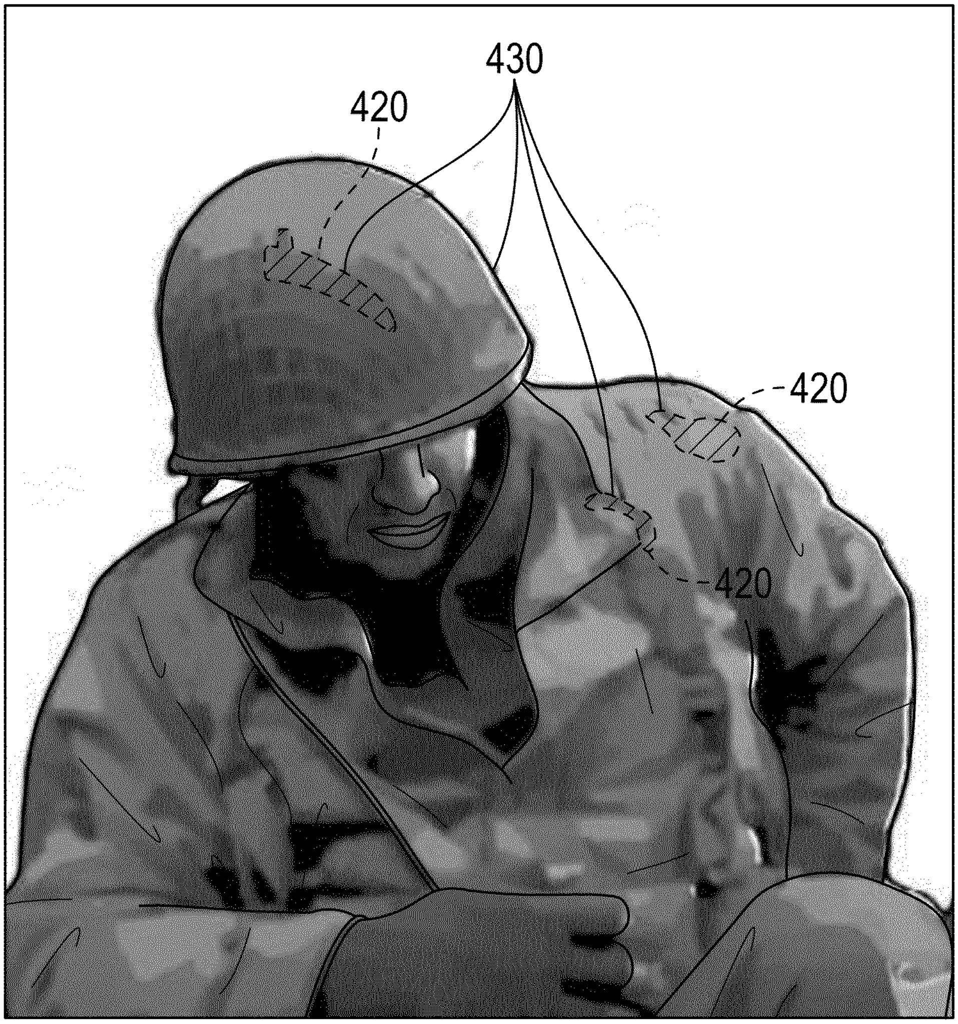
FIG. 9 is an illustration of color blocks applied to a character, showing the hard edges between the color blocks.

Color blocks, as described herein, are part of the posterization of images. Using a limited color palette results in a set of discrete areas of color known as color blocks. As shown in FIG. 9, the posterization of this example image allows only a few colors to appear on the uniforms, helmets, and faces. Hard edges 430 between color blocks 420 is another feature of posterization. Several hard edges 430 between adjacent colors are visible in FIG. 9. The gradient transition along a hard edge may be linear (relatively abrupt) or the transition may include a pattern such as dots, pixels, or checkerboard (less abrupt than a line, but still visible).

The first color block design standard 400 may include a first set of colors 410 and a first set of blocks 420 each defined by one or more hard edges 430 having a gradient transition 440. The first color block design standard 400 is developed to facilitate posterization of the visual elements 40, including both set pieces 20 and characters 10. The first set of colors 410 may, in practice, include shades of the same color. In some implementations, differences in contrast are more important than differences in color. Color blocks may be applied to characters 10 using makeup, as well as to set pieces 20 using paint. The first color block design standard 400 facilitates posterization during live-action filming by limiting the number of colors painted on set pieces (and applied to characters). This approach allows for maximum optimization of the posterization effect during post-production, when digital tools are used to isolate and enhance the limited colors, blocks, and hard edges.

Step 202 includes applying paint from a first theatrical paint set 460 to any of the visual elements 40 (set pieces 20 and characters 10) in accordance with the first color block design standard 400. The paint set 460 may include any of a variety of paint colors, tools, and applicators that are useful in accomplishing all the parts of the first color block design standard 400. Referring again to FIG. 7, several color blocks 420 are visible on the face of the actor 12. For example, different color blocks are apparent along the cheeks, below the cheekbones, along the sides of the nose, and across the tip of the nose. These color blocks were applied using makeup applied to a live actor 12 in accordance with first color block design standard 400.

The first set of colors 410 and the number of color blocks 420, of course, may evolve and change during pre-production. The filmmaker or artist, by applying the colors 410 and blocks 420 in accordance with the vision establishes the first color block design standard 400. In practice, all the colors 410 and blocks 420 for the project would be applied according to the first color block design standard 400.

Optionally, the artist may take a second set of reference photographs of one or more visual elements that were prepared in accordance with first color block design standard 400.

Selecting a first cyclorama tone 500 at Step 203 is part of the process of defining a set design guide 450. The cyclorama tone should be selected to complement the first color block design standard 400. The first cyclorama tone 500 may be applied to various parts of the set, including set pieces, clothing, and other visual elements. The artist may select and try one or more different tones before deciding on and selecting the first cyclorama tone 500 that works best with the first color block design standard 400—and facilitates maximum edge detection and posterization during post-production. The key for some implementations is to select a first cyclorama tone 500 that contrasts with the visual elements 20 and characters 10 to be filmed. For example, characters 10 with wardrobe costumes that are mostly green should be paired with a non-green cyclorama tone 500, such as a blue tone.

Step 204 includes preparing a color block design sheet 470 which provides a detailed creative guideline for subsequent artists and technicians to follow, including a series of color criteria 480 for the project. The color criteria 480 may include the first color block design standard 300, details about the first theatrical paint set 460, an optional second set of reference photographs, and the first cyclorama tone 500. In this aspect, the color criteria 480 defines a set design guide 450 for the project.

The pre-production phase of the project may also include sound design. The methods described herein may include a customized audio soundscape system. In some implementations, an audio designer will compose and/or assemble a catalog of audio elements comprising sound effects, ambient tones, environmental sounds, and the like. The design may load this catalog into a digital audio performance program such as Sound Plant. The system may be used to play specific sounds during filming. The actors may be fitted with a wireless, in-ear receiver so they can hear specific sounds without interfering with the audio recording of on-set dialogue and sounds.

The method 100 shown in FIG. 1 describes the steps involved in establishing a character design guide 350 and a set design guide 450. Together, the steps undertaken to establish these guides 350, 450 are part of the broader step of establishing a posterization standard. The posterization standard, in some example implementations, includes a line work standard, a color palette, a plurality of color blocks characterized by one or more hard edges, and a gradient transition associated with each of the hard edges.

Figure 2:
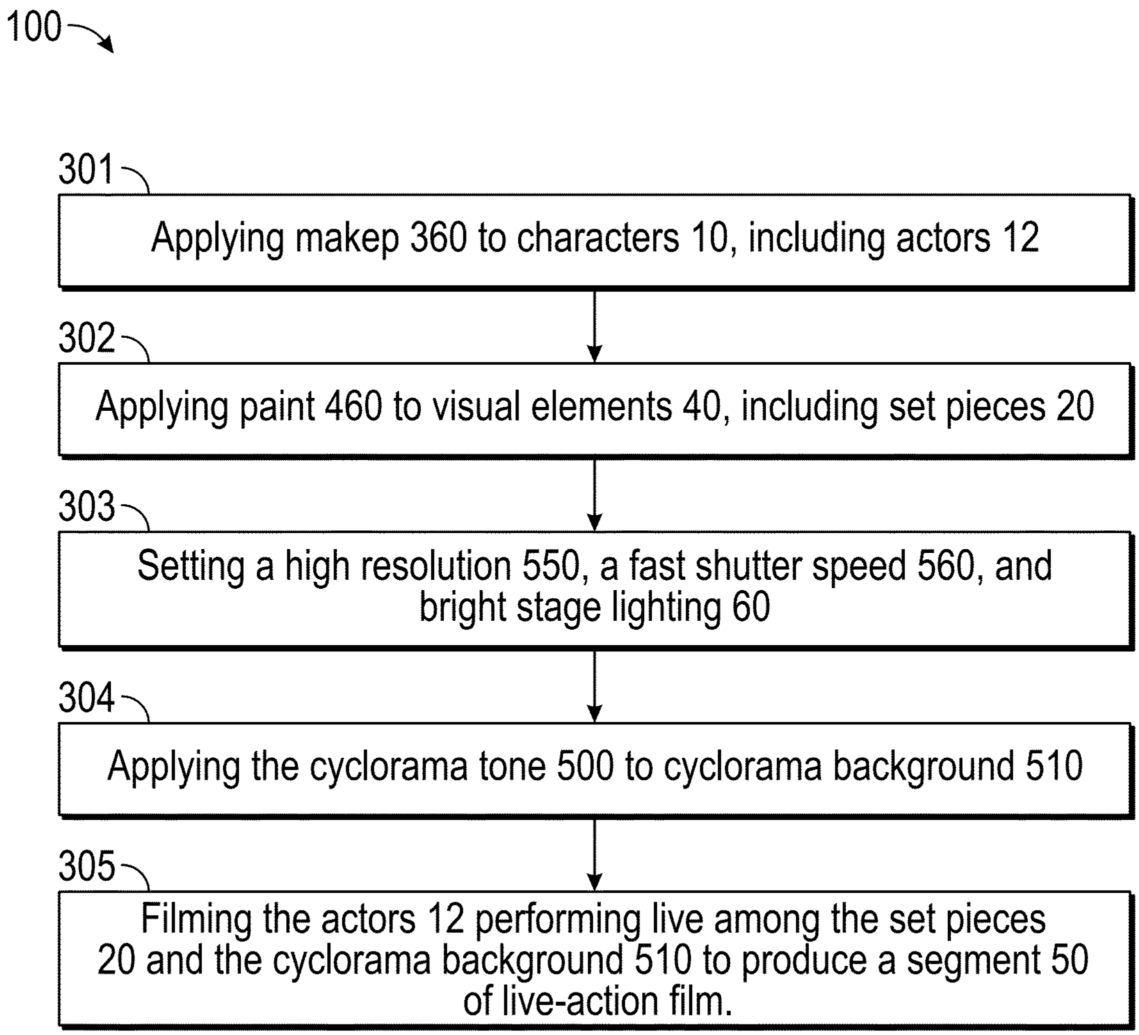
FIG. 2 is a flow chart listing some of the steps in another part of the example method.

Referring to FIG. 2, the method 100 in one example implementation includes the step of preparing the visual elements in accordance with the posterization standard. The preparing step includes applying theatrical makeup to the actors (first color blocks, then line work) and applying theatrical paint to the set pieces (first color blocks, then line work). This step may also include digitally preparing one or more digital elements in accordance with the posterization standard.

In accordance with the posterization standard—which includes the character design guide 350 and the set design guide 450—the makeup artists in Step 301 apply makeup from the first theatrical makeup kit 360 directly onto the actors 12 and any other character 10, such as a puppet or creature, that will appear or perform on stage during live filming. One or more of the first set of colors 410 (from the color block design standard 400) may be applied as a base coat to the actors 12 in the block-like or posterized style, as shown in FIG. 7. Other blocks of color may be applied in a series of layers. The consistency and material used for makeup and may be chosen to maximize the posterization effect; for example, by using a makeup with a matte finish and limited shine.

Step 301 may also include the step of applying line work 310 onto one or more actors 12, in accordance with the character design guide 350. Line work 310, as shown in FIGS. 5, 6, and 7, may include lines, sets of lines, hatching patterns, shading, stippling, outlines, contour lines, and any other stylized applied to the face and other exposed skin. The makeup artist may specific the use of particular tools, such as specific brushes and pens, in order to follow the character design guide 350. In this aspect, the type and color of makeup is important to ensuring that the makeup will work well together with the polarizing filter on the live-action camera lens to facilitate maximum edge detection on the glancing angle when the live footage is manipulated in digital post. In some implementations, the line work 310 should be as black and non-reflective as possible, to minimize any specular spilling of light on the line work.

Next, in Step 302, paint from the first theatrical paint set 460 may be applied to one or more of the visual elements 40 that will appear on stage, including wardrobe costumes, props, and other set pieces 20. As with the makeup application, one or more of the first set of colors 410 (from the color block design standard 400) may be applied as a base coat to the set pieces 20 in the posterized style. Other blocks of color may be applied in a series of layers. The consistency and paint may be chosen to maximize the posterization effect; for example, by using a makeup with a matte finish and limited shine.

Step 302 may also include the step of applying line work 310 onto one or more set pieces 20, in accordance with the set design guide 450. For example, line work 310 may be applied to props, such as the rifles shown in FIG. 8.

The paints may include water-based fabric paint for costumes, acrylic craft paint for props including plastics, and oil- or alcohol-based paints for wood or metal surfaces. As with the makeup, the type and color of paint is important to ensuring that the paint will work well together with the polarizing filter on the live-action camera lens to facilitate maximum edge detection on the glancing angle when the live footage is manipulated in digital post. In some implementations, the line work 310 should be as black and non-reflective as possible, to minimize any specular spilling of light on the line work.

Figure 10:
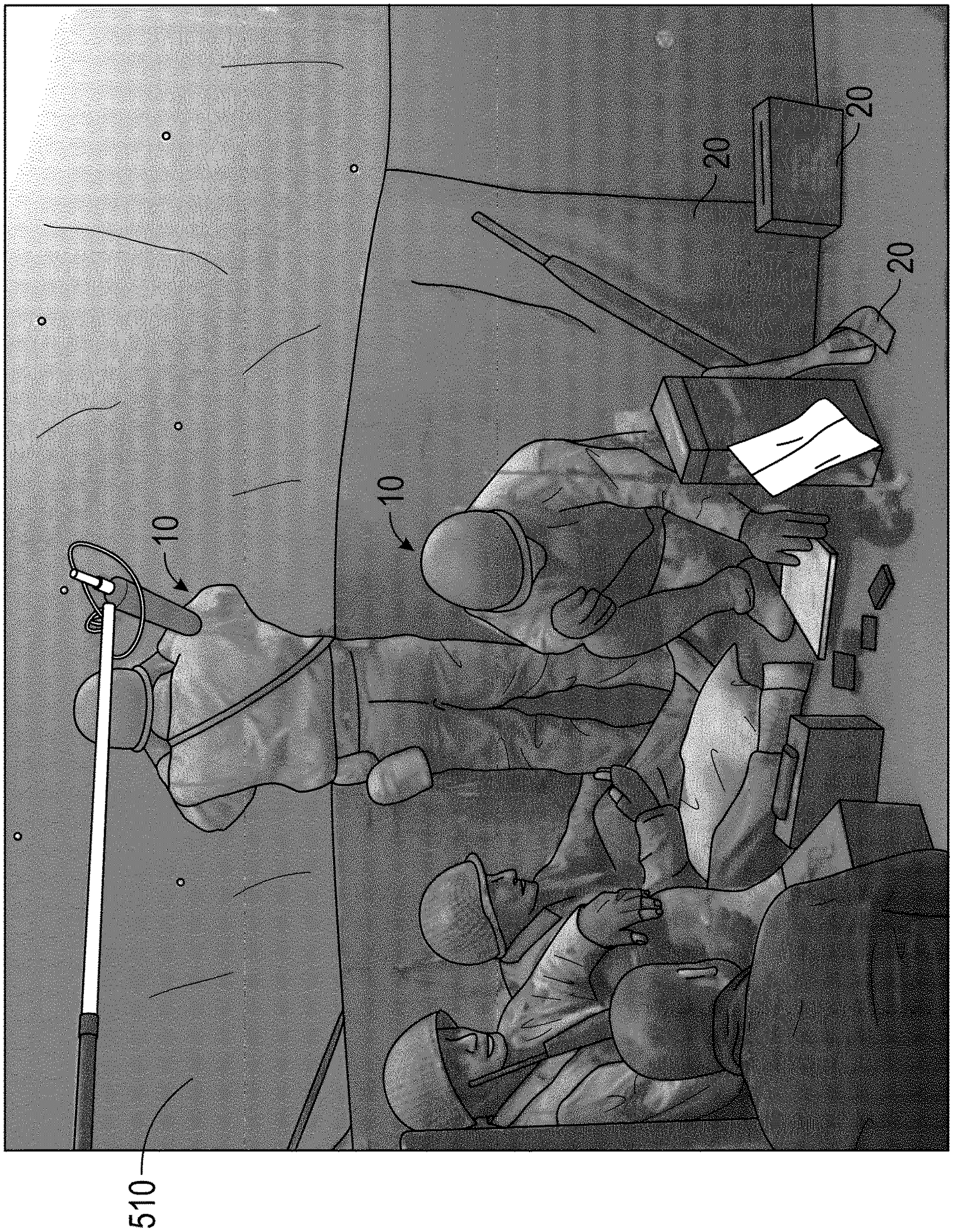
FIG. 10 is a photograph of a sound stage showing actors, visual elements, and a cyclorama background.

FIG. 10 is an illustration of a sound stage, showing the application of block colors 410 and line work 310 onto a variety of set pieces 20, including landscape elements, props, and wardrobe elements (jacket, gloves, and helmet). Line work 310 can also be seen on various landscape elements in the background. In some implementations, the line work 310 applied directly to the set pieces 20 for live filming is closely duplicated and digitally applied to other set pieces 20 during post-production. In this aspect, the creative details set forth in the design guides 350, 450 are particularly important as a guideline for the artists and technicians who are involved in post-production. In a related and important aspect, the application of block colors 410 and line work 310 directly onto actors 12 and set pieces 20 will facilitate the overall posterization style in a way that is more authentic and organic because the stylized markings are physically present on the actors 12 during their performances. Using the methods described herein, the film captures the nuanced expressions and acting performances of the actors 12 who are actually wearing the stylized markings appropriate for the film style. The result is a combination of both real and stylized elements, occurring simultaneously, in an enhanced hybrid of live action and animation.

Figure 11:
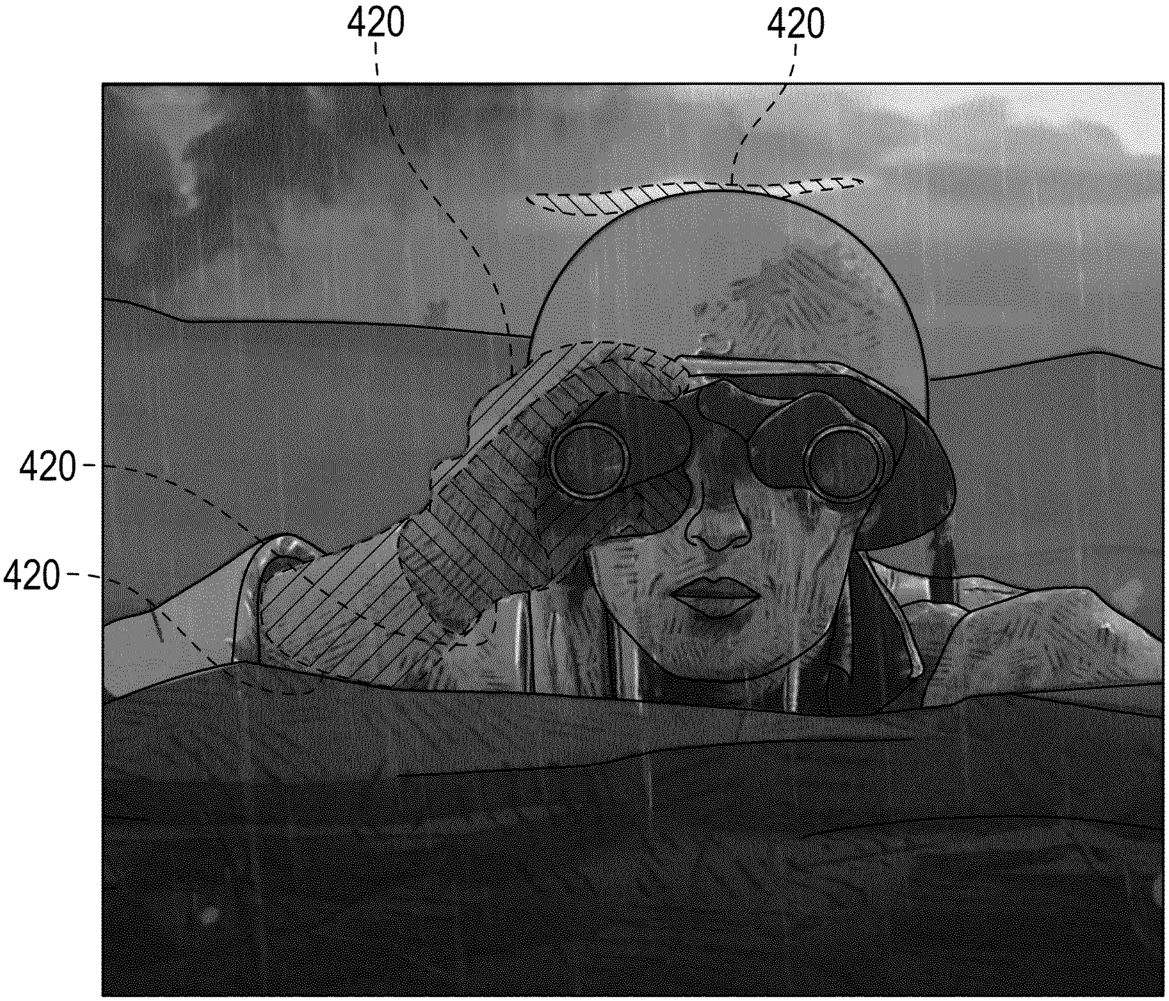
FIG. 11 is an illustration of a composite image processed according to the methods described herein, including color blocks and line work applied to various visual elements.

FIG. 11 is an illustration of a composite image processed according to the methods described herein, including color blocks 420 and line work 310 applied to various visual elements, including the actor, his clothing and gear, and the landscape including the sky.

Camera settings and lighting, in Step 303, are important for some implementations. The footage may be captured using the highest possible resolution, in some implementations, in order to facilitate re-framing and re-scaling during post. Higher-resolution footage is also easier to posterize because there is more information or image data captured in each frame. The resolution may be a minimum of 4K, Ultra HD (2160p), 3840 pixels by 2160 lines (8.3 megapixels, aspect ratio 16:9). High resolution also makes it easier to digitally attach line work or other patterns onto surfaces during post. Using a relatively fast shutter speed is important for some implementations, in order to minimize or impede blurring of elements in motion, such as vehicles. Faster shutters speeds also make it easier to digitally couple line work or other patterns with selected surfaces during post. Using a very bright setting for stage lighting 60 is also important for some implementations, in order to avoid or impede a blurred depth of field. Bright lighting 60 also helps keep all the visual elements in focus during shooting. The settings in Step 303, in general, facilitate the use of automated tools and processes during post-production, thereby making post faster and more efficient. In addition to setting up the soundscape system, as described herein, the method may include applying the first cyclorama tone 500 to a cyclorama background 510 at step 304.

Step 305 includes filming the actors 12 performing live among the set pieces 20 and, if present, in front of a cyclorama background 510, to capture a segment 50 of live-action film. The filming step may also include shooting additional visual elements that do not include characters 10, such as landscapes, weather shots, bullet strikes, explosions, long shots, establishing shots, and the like.

The method 100 described herein may be employed in order to establish and apply a second posterization standard to a select subset of visual elements. For example, an artist may decide to use a different standard for a select part of a film, or for selected elements in a film. A second posterization standard may include a second line work standard, a second color palette, a second plurality of color blocks characterized by one or more second hard edges, and a second gradient transition associated with each the second hard edges. The next steps include preparing a select subset of the visual elements in accordance with the second posterization standard, filming the select subset to capture a second segment of live-action film, and then compositing the second segment with the first segment of live-action film. In this aspect, the method 100 can be used to establish and apply any number of visual effects standards.

Figure 3:
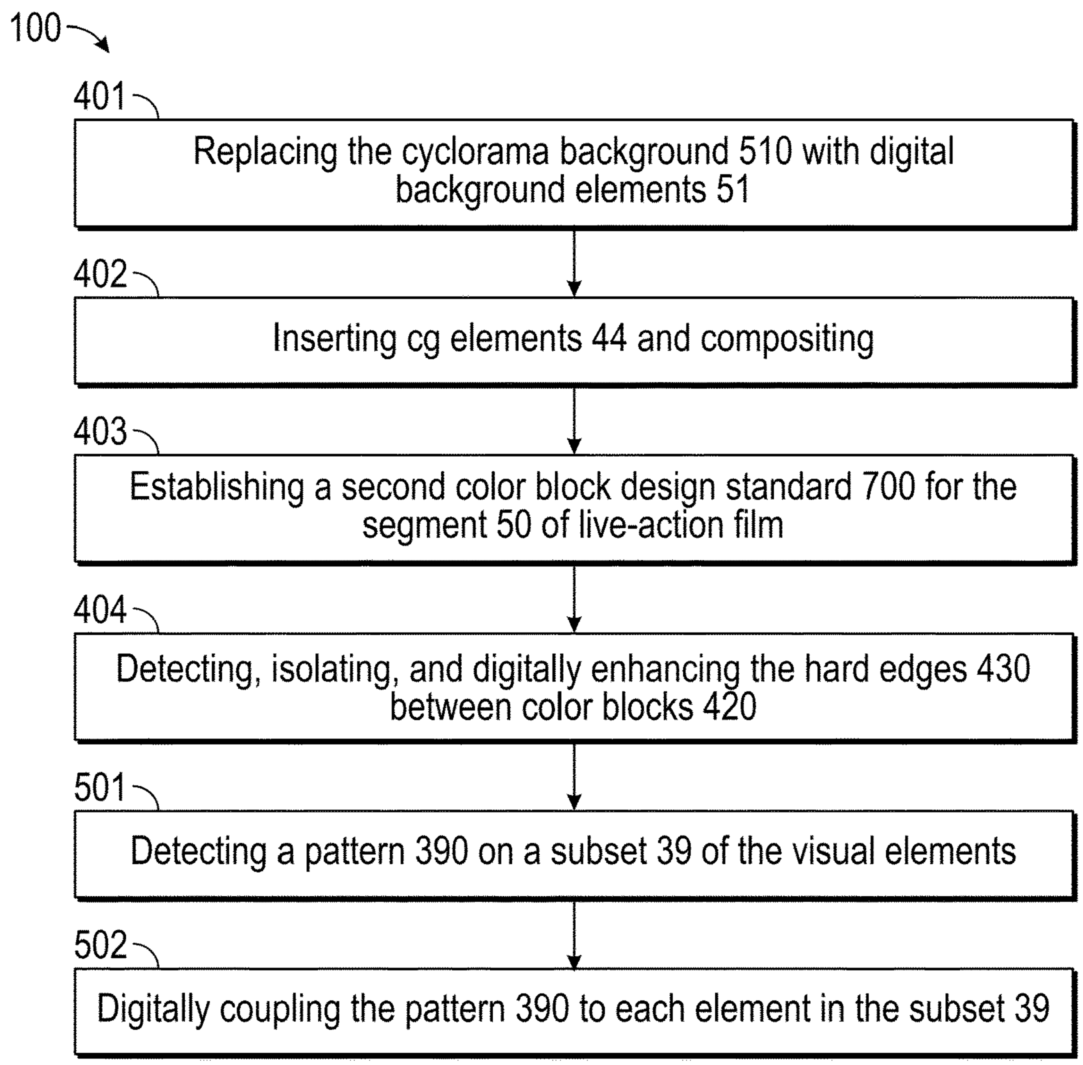
FIG. 3 is a flow chart listing some of the steps in another part of the example method.

In another aspect, the method 100 may include one or more steps of processing the live footage, known generally as post-production. Referring to FIG. 3, the method 100 may include replacing the cyclorama background 510 with one or more digital background elements 51 (Step 401). Step 402 may include inserting computer-generated visual elements 44 (CG elements 44) and other process steps that are generally considered to be part of a process known in the art as compositing. Compositing is the process of combining visual elements from separate sources into a single image, to create the illusion that all the combined elements are part of the same image. In some implementations, the live-action footage may be combined with CG visual elements 44. The CG elements 44 have a look and feel that is substantially the same as the live-action elements. Use of the single, unifying posterization standard should produce a film in which the visual elements are compatible visually and aesthetically. Software tools such as Maya, Nuke, Video Gogh, Premier Pro, After Effects, Sound Plant, and others may be useful during post-production and/or other steps in the process.

Compositing may be used to select and change selected elements captured in the segment of live-action film during post, such as changing colors, altering the size and shape of color blocks, changing the features of a hard edge, and applying patterns to other visual elements. For example, compositing may be used to detect a first hard edge, to detect detecting the first gradient transition associated with the first hard edge, and to digitally replace the first gradient transition with a new gradient transition. In this aspect, the abruptness of a selected hard edge can be changed during post.

Compositing may also be used to select a particular pattern and apply it, digitally, to other visual elements. In some implementations, a specific type of line work or other marking known as a pattern 390 may be designed and/or identified as an interesting part of the overall style. For example, a hatching pattern 390 may be found on one or more visual elements 40 (and/or CG elements 44) and the artist may want to replicate the pattern 390 on other selected elements or subset 39 of elements. Instead of re-drawing and inserting the pattern 390 onto each element in a subset 39, frame by frame, the method 100 may include detecting the pattern 390 (Step 501) and then digitally applying the pattern 390 to one or more elements in the subset 39 (Step 502). Software tools such as Video Gogh may be useful in attaching patterns to visual elements.

Figure 12:
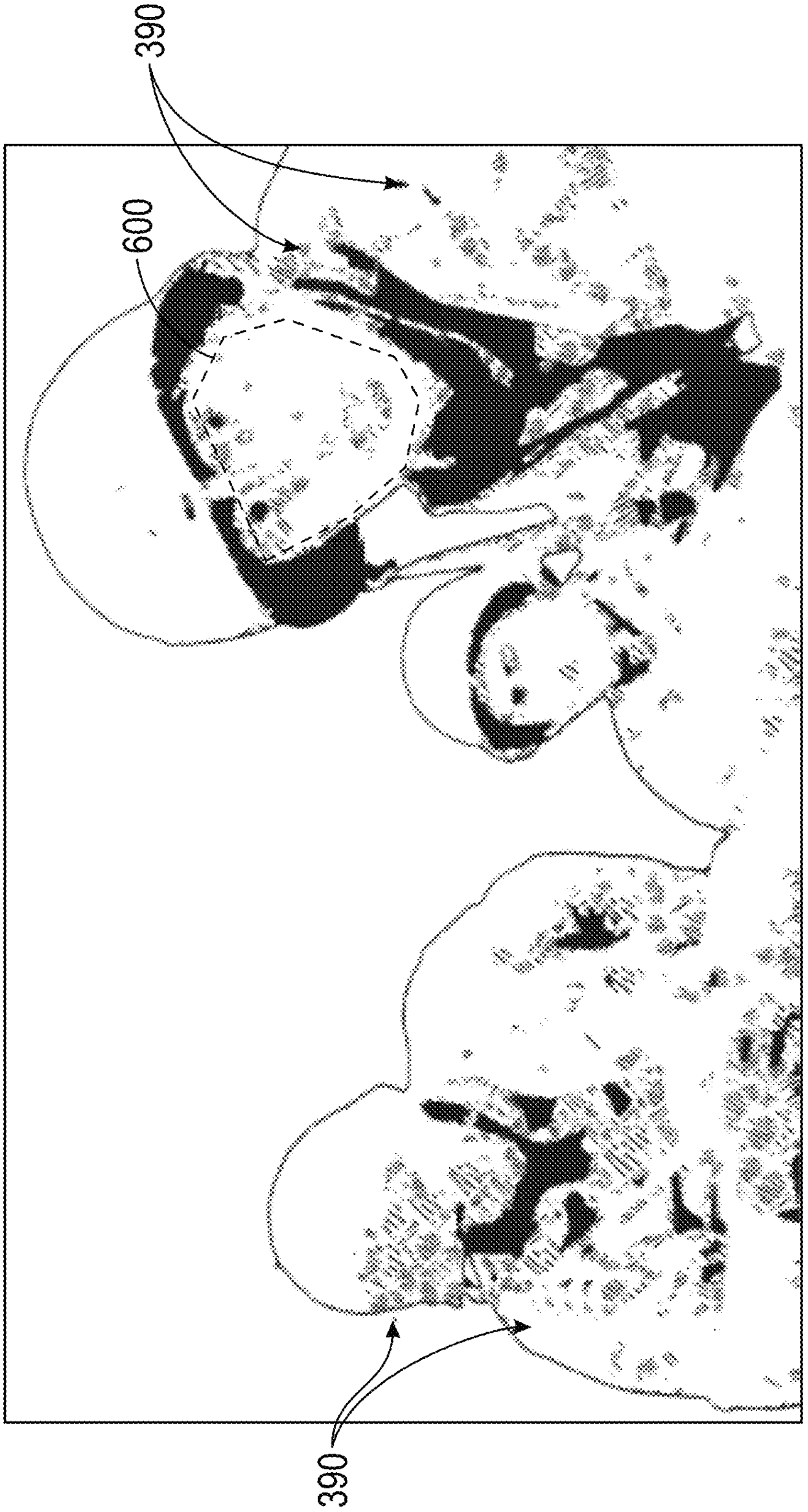
FIG. 12 is an illustration selectively enhanced to show a hatching pattern applied to various visual elements and to show a local area selected for display at a local frame rate.

FIG. 12 is an illustration selectively enhanced to show a hatching pattern 390 that is applied to various visual elements. Once applied using this method, the pattern 390 may be digitally attached or coupled to each place (onto the actor 12, onto the clothing, and/or onto any other visual elements) and, accordingly, the pattern 390 will appear consistently on those places. In a related aspect, this technique may be used to couple a pattern 390 to a face (or a portion thereof) in a technique known as masking.

This technique of digitally applying a pattern 390 may be used to select and apply any of a variety of features, including but not limited to line work, hatching patterns, colors, makeup colors, paint colors, color blocks, gradient transitions, and digital elements.

Post-production treatment of the segment 50 of live-action film, in some implementations, includes the step of digitally posterizing one or more images or sequences of images (Step 403). For example, one or more sequences of the live-action segment 50 may include inadequate or different features that detract from the overall posterization style. This can be treated and modified during post-production. In this aspect, the artist may establish a second color block design standard 700 for a portion of the segment 50. The second color block design standard 700 may include a second set of colors 710 for each of a second set of blocks 720. Each block in the set 720 has a single color and is defined by one or more second hard edges 730, each having a second gradient transition 740 associated therewith. The second gradient transition 740 along the second hard edge 730, as described herein, may be linear (most abrupt) or may include a pattern (less abrupt, but still visible and easily detected). In this post-production posterizing, software tools may be used to isolate and enhance the hard edges 730 and/or the gradient transitions 740. For example, the artist may elect to detect, isolate, and/or digitally enhance one or more of the second hard edges 730 between and among the second set of color blocks 720 (Step 404).

In some implementations, the frame rate may be altered for a specific area of an image in order to highlight or feature that area. For example, an area of high interest (such as the face of a speaking actor) may be featured by increasing the frame rate to show more detail, while other areas of the image maintain a lower frame rate. Software tools such as After Effects may be useful for manipulating frame rates.

Figure 4:
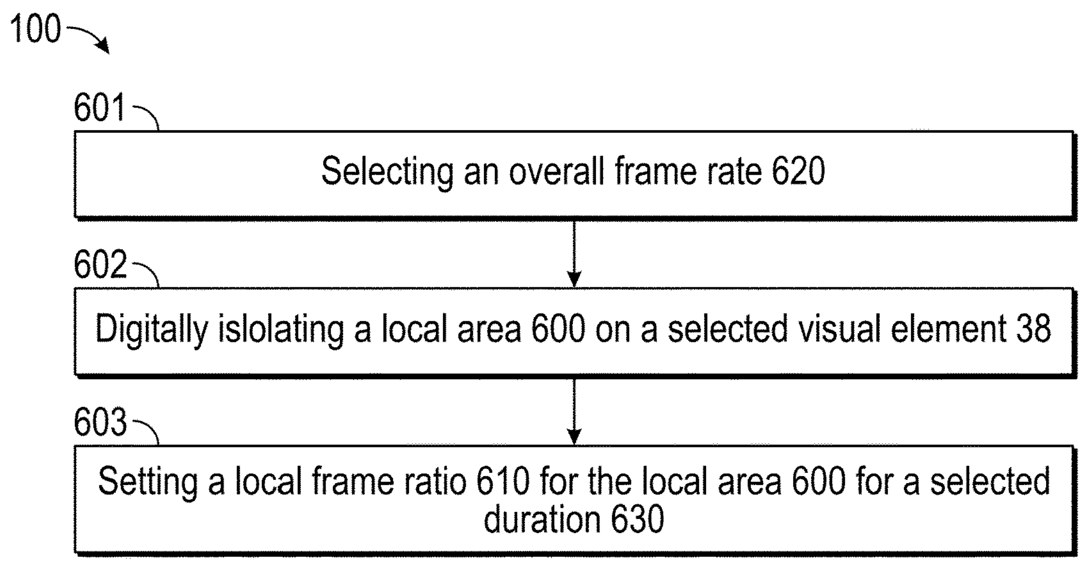
FIG. 4 is a flow chart listing some of the steps in another part of the example method.

Referring to FIG. 4, the method 100 may include selecting an overall frame rate 620 for the film (Step 601). The segment 50 of live-action footage may be shot using a relatively high frame rate, such as twenty-four frames per second. The overall frame rate 620 for the film may be set lower, such as twelve frames per second. Step 602 may include selecting a local area 600 associated with one or more selected visual elements 38. The selected visual element 38, for example, may be the face of an actor 12, as shown in FIG. 12. The artist may then assign or set a local frame rate 610 (Step 603) for the outlined local area 600. The local frame rate 610 may continue to remain in effect during a selected duration 630 of the film in order to create an isolated segment of film. During the selected duration 630 of a scene, the local area 600 is displayed at a local frame rate 610 that is different from (usually higher than) the overall frame rate 620. For example, the background elements may be displayed at the overall frame rate 620 or perhaps even lower, such as twelve frames per second, while the local area 600 is displayed at a local frame rate 610 of eighteen frames per second. The method includes integrating the isolated segment of film (captured at the local frame rate) into the first segment of live-action film (which was captured at the overall frame rate).

The effects of frame-rate manipulation include (1) highlighting or featuring the local area 600 as opposed to other areas of the image, and (2) enhancing and otherwise supporting the animated look and feel of the live action. The effect can be subtle or striking, depending on the difference between frame rates. Frame-rate manipulation may also be applied to any of the other visual elements 40, including CG elements 44, to enhance the animated look and feel or otherwise support the posterized style of the film.

Although several implementations and embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims that follow, such terms are used in a generic and descriptive sense only and should not be construed as limiting the described invention or the claims that follow.

What is claimed is:

1. A method of producing hybrid animation, said method comprising:

establishing a posterization standard comprising a line work standard, a color palette, a plurality of color blocks characterized by one or more hard edges, and a gradient transition associated with each of said one or more hard edges, wherein said step of establishing a posterization standard comprises: (a) establishing a character design guide comprising a first theatrical makeup kit including one or more makeup colors to complement said color palette, and a first set of reference photographs; and (b) establishing a set design guide comprising a first set of theatrical paint colors including one or more set colors to complement said color palette, and a first cyclorama tone;

preparing one or more visual elements in accordance with said posterization standard, said one or more visual elements comprising one or more actors and one or more set pieces; and filming said one or more actors performing live among said one or more set pieces to capture a first segment of live-action film.

2. A method of producing hybrid animation, said method comprising:

establishing a posterization standard comprising a line work standard, a color palette, a plurality of color blocks characterized by one or more hard edges, and a gradient transition associated with each of said one or more hard edges, wherein said step of establishing a posterization standard comprises: (a) establishing a character design guide comprising a first theatrical makeup kit including one or more makeup colors to complement said color palette, and a first set of reference photographs; and (b) establishing a set design guide comprising a first set of theatrical paint colors including one or more set colors to complement said color palette, and a first cyclorama tone;

preparing one or more visual elements in accordance with said posterization standard, said one or more visual elements comprising one or more actors and one or more set pieces, wherein said step of preparing one or more visual elements comprises: (1) applying theatrical makeup to said one or more actors in accordance with said character design guide; and (2) applying theatrical paint to said one or more set pieces in accordance with said set design guide; and, filming said one or more actors performing live among said one or more set pieces to capture a first segment of live-action film.

3. A method of producing hybrid animation, said method comprising:

establishing a posterization standard comprising a line work standard, a color palette, a plurality of color blocks characterized by one or more hard edges, and a gradient transition associated with each of said one or more hard edges, preparing one or more visual elements in accordance with said posterization standard, said one or more visual elements comprising one or more actors and one or more set pieces, wherein said step of preparing one or more visual elements comprises: (1) applying theatrical makeup to said one or more actors in accordance with said character design guide; and (2) applying theatrical paint to said one or more set pieces in accordance with said set design guide; and (3) digitally preparing one or more digital elements in accordance with said posterization standard;

filming said one or more actors performing live among said one or more set pieces to capture a first segment of live-action film; and, compositing said first segment of live-action film with said one or more digital elements, wherein said step of compositing comprises:

detecting a first pattern associated with at least one of said one or more visual elements;

selecting a first subset of said one or more visual elements; and digitally applying said first pattern to at least one of said first subset for a first duration.

4. A method of producing hybrid animation, said method comprising:

establishing a posterization standard comprising a line work standard, a color palette, a plurality of color blocks characterized by one or more hard edges, and a gradient transition associated with each of said one or more hard edges, preparing one or more visual elements in accordance with said posterization standard, said one or more visual elements comprising one or more actors and one or more set pieces, wherein said step of preparing one or more visual elements comprises: (1) applying theatrical makeup to said one or more actors in accordance with said character design guide; and (2) applying theatrical paint to said one or more set pieces in accordance with said set design guide; and (3) digitally preparing one or more digital elements in accordance with said posterization standard;

filming said one or more actors performing live among said one or more set pieces to capture a first segment of live-action film; and compositing said first segment of live-action film with said one or more digital elements, wherein said step of compositing comprises:

detecting a first pattern associated with at least one of said one or more visual elements, wherein said first pattern is a feature selected from the group consisting of a line work style, a hatching pattern, a select color, a select makeup color, a select paint color, a select color block size, a select color block shape, a select gradient transition, and a select digital element;

selecting a first subset of said one or more visual elements; and digitally applying said first pattern to at least one of said first subset for a first duration.

* * * * *